Feb. 18, 1936.  K. G. WIRICK  2,031,402
SLAT HOUSE
Filed March 20, 1935
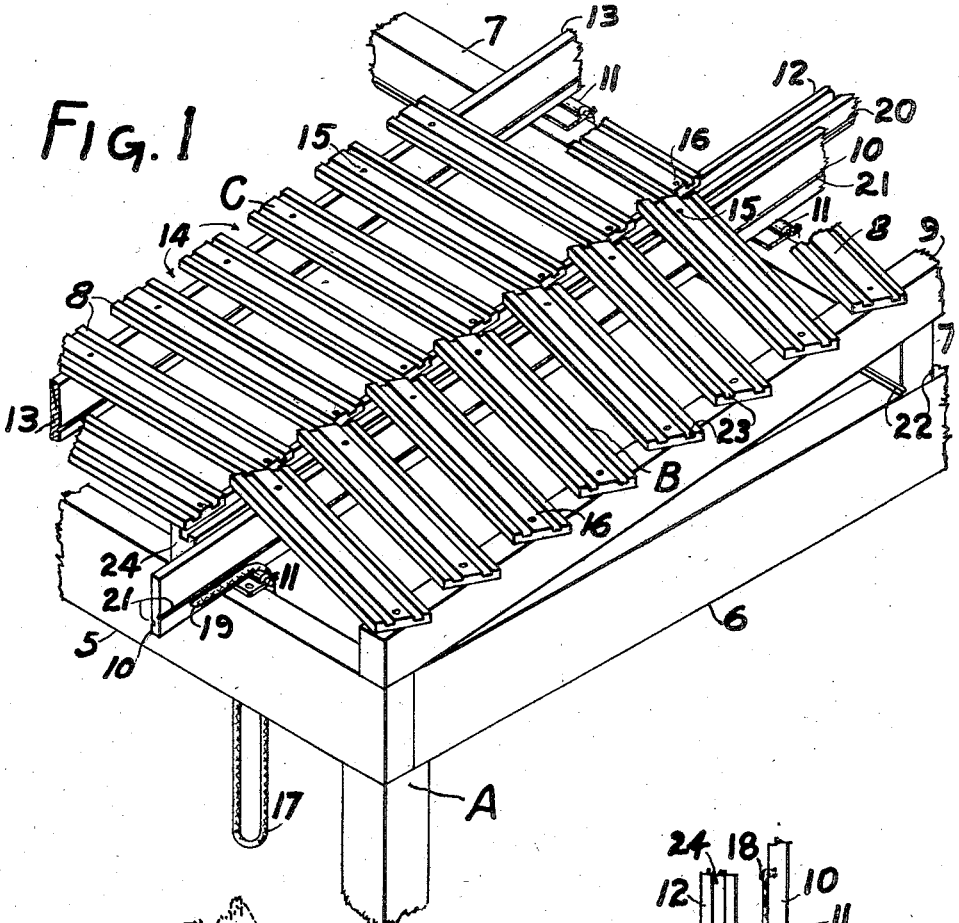
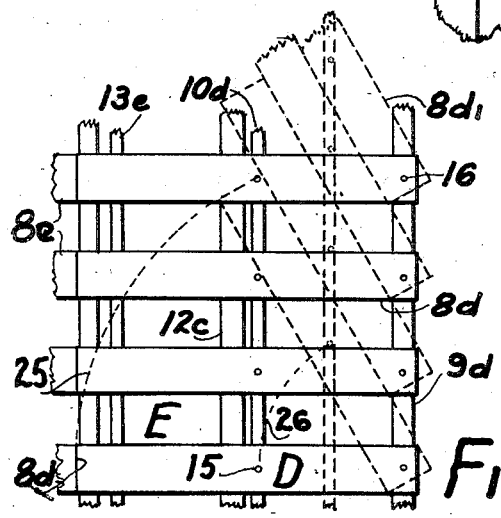
INVENTOR.
Kirk G. Wirick Patented Feb. 18, 1936

2,031,402

UNITED STATES PATENT OFFICE 2,031,402

SLAT HOUSE

Kirk Grove Wirick, Glendale, Calif., assignor to Lounsberry and Harris, Los Angeles, Calif., a corporation of California Application March 20, 1935, Serial No. 12,027

8 Claims. (Cl. 47—28)

Slat or lath houses in their application to the nursery industry are intended to provide a shelter for growing plants so as to protect the tender plants from the full and direct sunlight but to afford free circulation of air and to otherwise simulate outdoor growing conditions for the nursery stock.

In the present stage of the art these structures generally comprise a frame of posts, girders and rafters the top surface of which is level or nearly so, the exceptions being where the ground slopes, in which case the top of the frame conforms more or less to the topography of the site. On this frame, slats, which are spaced apart, are placed at right angles to the rafters and nailed thereto, the whole structure thus being a rigid one.

While the present fixed slat type of structure provides a certain amount of shade for the plants for which it may be intended there are some conditions, due to its inflexibility, under which too much or too little shade is provided and there are other cases, during foggy and rainy weather, where the structure collects moisture to allow it to drop on the plants to their injury.

With the foregoing in view, the objects of this invention have to do, on the one hand, with means for controlling the width and the direction of the slots between the roof slats through which the sunlight must pass to reach the nursery plants and, on the other hand, it has to do with providing means to prevent the dripping of roof water on the plants.

It should also be understood at the outset that one of the objects of this invention has to do with the ease, with the simplicity and with the rapidity with which the foregoing means can be put into operation so as to function properly under the daily changes of light and heat between forenoon, midday and afternoon as well as the seasonal changes and a further object of the invention is to provide a cheap and easily to be constructed shelter for the purposes mentioned.

I attain the objects of my invention in the structure of which the accompanying drawing is merely illustrative and as more specifically set forth in the appended claims.

Of the drawing Fig. 1 is an isometrical view of a portion of a frame on which are two movable panels of a slat roof typical of my invention, Fig. 2 is a plan view of a portion of the operating mechanism thereof and Fig. 3 is a plan view showing a modified form of my invention.

In Fig. 1 the frame A is shown with its plates 5 and 6 on the same level and the purlin 7 disposed parallel to 5 but at a higher elevation. On this frame A panels B and C each comprise a pair of rafters disposed transversely on 5 and 7 and a plurality of slats 8. The rafters thus are inclined to the vertical and the upper surface of the slats form a sloping plane which is herein referred to as the roof plane.

In the end panel B the rafter 9 is fixed to the frame A and its companion rafter or shifting bar 10 is supported on rollers 11 bracketed to the frame members which it crosses. In panel C which is typical of all the interior panels of the improved shelter, the rafter 12 is fixed to the frame and its companion shifting member 13 is disposed on rollers 11 in a manner similar to 10.

The slats 8 of the roof panels are equally spaced along the rafters as indicated at 14 and they are pivoted thereto as indicated at 15 and 16.

At any convenient roller 11 of each panel a rope 17 is looped over the roller and has its ends secured on opposite sides of the shifting bar at points above and below the roller as indicated at 18 and 19. To operate the movable panels an attendant pulls one side of the rope loop to position the slats diagonally to the rafters as indicated in panel B and by pulling on the other leg of the loop the panel will be moved downward to position the slats with angularity opposite to that shown.

The greatest width of the slots occurs when the slats are disposed at right angles to the rafters and the width decreases as the slats are rotated about their pivotal supports in the fixed rafters either up or down the slope. The effective size of the slots to let the direct rays of the sun pass also is dependent upon the thickness of the slats because it is the projection of the diagonal of the slat that casts the shadow and not the right projection thereof. From which it follows that more light will pass when the slats are turned towards the sun than when the slats are disposed athwart the sun's rays.

Suppose, that, in a given slat house the structure has its purlins running in a north and south direction. Then during the hot season, when more shade is desired for the plants under the structure, the panels should be operated to position the slats in a northeasterly-southwesterly direction during the latter part of the forenoon and in a northwesterly-southeasterly direction in the afternoon.

In constructing a slat house of this type, for a given location and according to climatic conditions, the width of the slats and the spacing thereof should be determined so that, with the slats perpendicular to the rafters and lying in a north and south direction, the greatest desired sunlight during the early and late parts of the day of the hot season will pass; or so that in the spring and autumn the greatest amount of sunlight desired during midday will pass. In this manner the work required to operate the panels can be minimized and yet the structure will provide the amount of shade desired and with ample roof opening for proper ventilation for the growing plants.

Now with reference to controlling roof water grooves 20, 21 and 22 are formed near the bottom in the sides of the rafters, shifting bars and purlins respectively. The roof slats 8 have grooves 23 in their upper surfaces and the fixed rafters have grooves 24 in their upper edges adapted to receive water from the slat grooves. By means of these grooved members water can be drained from every portion of the shelter to prevent dripping on the plants.

The height of the shifting bars is greater than the height of the fixed rafters and the slats of each panel overhang those of the panel to the left to compensate for the sidewise movement of that end of the panel slats when the panels are operated from the phase shown in panel C to that shown in panel B.

In the modified form of the invention shown in Fig. 3 portions of two panels designated D and E are illustrated in which the length of the slats of each panel is equal to the combined width of the two panels. The slats 8d of panel D are pivoted near their mid-length to the shifting bar 10d and overlap the slats 8e of panel E the full width of panel E.

Disregarding the effect of the rafters and frame, the shade ratio is 50% when the slats are in the phase shown in solid lines and spaced apart equal to the width of the slats, as shown in Fig. 3, but the shade ratio is 100% when the panel is in the phase indicated in the dotted lines.

By making the length of the shifting bars accordingly, the panels can also be shifted in the opposite direction to dispose the slats with angularity opposite to that shown in the dotted lines. Then during the heavy rain the panels can be operated in that direction which will give a shingle effect to the slats in the sloping roof.

The roof slats may be of various cross section. The one shown in Fig. 1 is suited to wood slats. But in the modified form of the invention shown in Fig. 3 I prefer to use corrugated sheet metal slats having one or more corrugations per slat the essential thing being that the edges upstand so that water can not run across the slats.

From the foregoing it should be apparent that a slat house embodying the principles of this invention can be utilized to secure a wide range of shade conditions with proper ventilation through the roof and at the same time to afford protection to the plants during foggy or rainy weather.

Having thus described the general aspects of the invention, which is not limited to the nursery industry, what I claim is:

1. In a slat roof the construction which comprises: inclinatorily disposed grooved rafters and spaced grooved slats disposed diagonally to the rafters thus providing a downward sloping channel for every portion of the roof to drain water therefrom.

2. In a slat house: a frame; inclinatorily disposed rafters on the frame; spaced grooved slats on the rafters thus forming an inclined roof plane and means to move the slats in the roof plane to govern the slope of the grooves to conduct water from the house.

3. In a slat house the combination of: fixed rafters; movable rafters; roller bearings for the movable rafters and slats pivoted to the rafters.

4. In a slat house: a roof frame including fixed rafters and movable rafters; spaced slats pivoted to the rafters and means to shift the movable rafters in the plane of the roof.

5. In a slat house: a roof frame including sloping grooved fixed rafters; sloping grooved movable rafters; spaced grooved slats on the rafters thus forming a sloping roof plane; one end of each slat pivoted to a fixed rafter and the other end pivoted to a movable rafter and means to shift the movable rafters parallel to the roof plane.

6. In a roof panel: a pair of spaced rafters; a plurality of slats pivoted to the rafters and means to shift one rafter with respect to the other rafter to control the width of the slots between the slats.

7. In a slat roof: a plurality of adjacently disposed panels each comprising a fixed rafter; a movable rafter; a plurality of slats each slat pivoted near one end thereof to the fixed rafter and, at an intermediate point, pivoted to the movable rafter and means to shift the panel about its pivotal supports in the fixed rafter thus to position the slats with various degrees of angularity with respect to the rafters.

8. In a slat roof a plurality of adjacently disposed and overlapping roof panels each comprising: a pair of rafters and a plurality of slats and means to shift the panels to govern the overlap thereof on the adjacent panel.

KIRK GROVE WIRICK.